United States Patent
Jeuk et al.

(10) Patent No.: US 10,367,735 B2
(45) Date of Patent: *Jul. 30, 2019

(54) CLOUD PROVIDER CLASSIFICATION FOR DIFFERENT SERVICE DEPLOYMENT SCHEMES

(71) Applicant: Cisco Technology, Inc., San Jose, CA (US)

(72) Inventors: Sebastian Jeuk, San Jose, CA (US); Gonzalo Salgueiro, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/683,108

(22) Filed: Aug. 22, 2017

(65) Prior Publication Data

US 2019/0068495 A1  Feb. 28, 2019

(51) Int. Cl.
| | |
|---|---|
| H04L 12/28 | (2006.01) |
| H04L 12/741 | (2013.01) |
| H04L 12/24 | (2006.01) |
| H04L 29/08 | (2006.01) |
| H04L 29/12 | (2006.01) |
| H04L 12/751 | (2013.01) |

(52) U.S. Cl.
CPC .............. H04L 45/74 (2013.01); H04L 41/50 (2013.01); H04L 45/02 (2013.01); H04L 61/2007 (2013.01); H04L 67/10 (2013.01); H04L 61/6018 (2013.01)

(58) Field of Classification Search
CPC .................................................. H04L 45/74
See application file for complete search history.

(56) References Cited

U.S. PATENT DOCUMENTS 9,069,979 B2 *  6/2015  Srinivasan ............. G06F 21/62
9,588,977 B1  3/2017  Wang et al.
(Continued)

OTHER PUBLICATIONS

S. Jeuk, et al., "Tenant-ID: Tagging Tenant Assets in Cloud Environments", 2013 13th IEEE/ACM International Symposium on Cluster, Cloud, and Grid Computing, May 13-16, 2013, Delft, Netherlands, 6 pages.
(Continued)

*Primary Examiner* — Gerald A Smarth
(74) *Attorney, Agent, or Firm* — Edell, Shapiro & Finnan, LLC

(57) ABSTRACT

A cloud provider provides services to tenants over a network. Each cloud-based service is configured according to a respective service deployment scheme. The cloud provider maintains, for each service, classification information, including: a scheme type; a three-tuple cloud identifier including a cloud identifier, a service identifier, and a tenant identifier; and one or more scheme-specific service identifiers. The cloud provider distributes the classification information within the cloud provider, including to the services, to enable a respective tenant to exchange Internet Protocol (IP) packets with, and thereby access, a respective service and components of the service based on the classification information. The IP packet includes, for the respective service, the scheme type, the cloud identifier, the service identifier, the tenant identifier of the respective tenant, and the one or more scheme-specific service identifiers.

20 Claims, 12 Drawing Sheets

(56) References Cited

U.S. PATENT DOCUMENTS

| | | |
|---|---|---|
| 9,729,406 B2 | 8/2017 | Jeuk et al. |
| 2013/0138504 A1* | 5/2013 | Bookstaff .......... G06Q 30/0251 705/14.49 |
| 2013/0212129 A1* | 8/2013 | Lawson ............. G05B 19/4185 707/779 |
| 2014/0075501 A1 | 3/2014 | Srinivasan et al. |
| 2014/0169215 A1 | 6/2014 | Rajendran et al. |
| 2015/0264200 A1 | 9/2015 | Ando |
| 2016/0014141 A1 | 1/2016 | Ganapathy et al. |
| 2016/0323183 A1 | 11/2016 | Jeuk et al. |
| 2017/0025040 A1* | 1/2017 | Maturana ............ G06F 17/5009 |
| 2017/0093640 A1* | 3/2017 | Subramanian .......... H04L 41/12 |
| 2018/0027100 A1 | 1/2018 | Jeuk et al. |
| 2018/0131689 A1* | 5/2018 | Vasters .................. H04L 12/66 |
| 2018/0295134 A1* | 10/2018 | Gupta .................... H04L 63/10 |

OTHER PUBLICATIONS

S. Jeuk, et al., "A Novel Approach to Classify Cloud Entities: Universal Cloud Classification (UCC)", 2015 15th IEEE/ACM International Symposium on Cluster, Cloud and Grid Computing, May 4-7, 2015, Shenzhen, China, 4 pages.

S. Jeuk, et al., "Network Segmentation in the Cloud a Novel Architecture Based on UCC and IID", 2015 IEEE 4th International Conference on Cloud Networking (CloudNet), Oct. 5-7, 2015, Niagara Falls, ON, Canada, 6 pages.

S. Jeuk, et al., "Towards Cloud-Aware Policy Enforcement with Universal Cloud Classification as a Service (UCCaaS) in Software Defined Networks", 2016 IEEE 9th International Conference on Cloud Computing, Jun. 27-Jul. 2, 2016, San Franciso, CA, 8 pages.

Baker et al., "A Model for IPv6 Operation in OpenStack", Internet Draft, Cisco Systems, Feb. 8, 2015, 38 pages.

Jeuk et al., "Universal Cloud Classification (UCC) and its Evaluation in a Data Center Environment", 2014 IEEE 6th International Conference on Cloud Computing Technology and Science, Dec. 15-Dec. 18, 2014, 6 pages.

Jeuk et al., "Towards Cloud, Service and Tenant Classification for Cloud Computing", 2014 14th IEEE/ACM International Symposium on Cluster, Cloud and Grid Computing, May 26-May 29, 2014, 10 pages.

Deering et al., "Internet Protocol, Version 6 (IPv6)", Cisco, Dec. 1998, 39 pages.

* cited by examiner

200

| CLOUD-ID | ID VALUE (NUMERIC - 48 BIT) |
|---|---|
| AMAZON | 001.1310010 |
| GOOGLE | 001.1310020 |
| MICROSOFT | 001.1310030 |
| NIRVANIX | 001.1310040 |

| SERVICE-ID | ID VALUE (NUMERIC - 6 BYTE) |
|---|---|
| DROPBOX | 001.2535200000.000 |
| S3 | 002.2394800000.000 |
| SALESFORCE | 001.0061700000.000 |

| TENANT-ID | BITS |
|---|---|
| LAYER 2 TENANT-ID | 16 BIT VALUE |
| METADATA | 32 BIT VALUE |

FIG.4

| | | | | | | | | | | | | | | | | |
|---|---|---|---|---|---|---|---|---|---|---|---|---|---|---|---|---|
| 00000 | 60 | 73 | 5c | 5c | df | 83 | 3c | 00 | 00 | 00 | 06 | 1e | 43 | 9f | 86 | dd | 60 | 00 |
| 00016 | 00 | 00 | 00 | 00 | 30 | 3c | 40 | 20 | 01 | 06 | ab | ab | 00 | 00 | 00 | 00 | 00 |
| 00032 | 00 | 00 | 00 | 00 | 00 | 00 | 01 | 20 | 06 | ab | ab | 00 | 12 | 12 | 12 | 00 | 00 |
| 00048 | ab | ab | ab | ab | ab | ab | 02 | 3b | 02 | cd | cd | 04 | cd | cd | cd | 00 | 06 |
| 00064 | 3d | 1b | 2c | 04 | 53 | ab | 96 | 00 | 06 | 69 | 60 | 00 | 00 | 00 | 00 | cc | 0e |
| 00096 | 04 | 54 | 8d | 0c | 74 | 73 | 49 | 78 | | | | | | | | de | fc |
| 00096 | S-ID | | | | | | | | | T-ID | | | | | | | C-ID |

| VER 0 C R R R R R R | LENGTH | MD TYPE = 0x2 | NEXT PROTOCOL |
|---|---|---|---|
| SERVICE PATH IDENTIFIER | | | SERVICE INDEX |
| CLOUD ID | | | |
| APPLICATION ID | | | |
| MICRO-SERVICE ID | | | |
| SERVICE ID | | | |
| TENANT ID | | | |

CLOUD PROVIDER CLASSIFICATION FOR DIFFERENT SERVICE DEPLOYMENT SCHEMES

TECHNICAL FIELD

The present disclosure relates to cloud computing.

BACKGROUND

Entities in a cloud computing environment include cloud providers, cloud services supported by the cloud providers, and tenants or consumers that use the cloud services. While multi-tenancy (i.e., offering of services across many tenants within a cloud provider) is an important aspect of cloud computing, conventional techniques to identify the cloud computing entities do not allow classification and isolation on a per-cloud, per-service, and per-tenant basis at the network layer. In addition, the conventional techniques do not account for services configured in accordance with different types of service deployment schemes.

BRIEF DESCRIPTION OF THE DRAWINGS

FIG. 2 is an illustration of example cloud identifiers (cloud IDs) used to identify cloud providers, according to an example embodiment.

FIG. 3 is an illustration of example service IDs used to identify a service within/provided by a cloud provider, according to an example embodiment.

FIG. 4 is an illustration of example tenant IDs used to identify tenants, according to an example embodiment.

FIG. 7 is an illustration of an example header of an IP packet used in the example environment of FIG. 6 and that includes a cloud ID, a service ID, and a tenant ID, according to an example embodiment.

FIG. 12 is an illustration of a header of an IP packet that includes hierarchical classification information for a service-function-chaining deployment (SFC) scheme, according to an example embodiment.

DESCRIPTION OF EXAMPLE EMBODIMENTS

Overview

Figure 1:
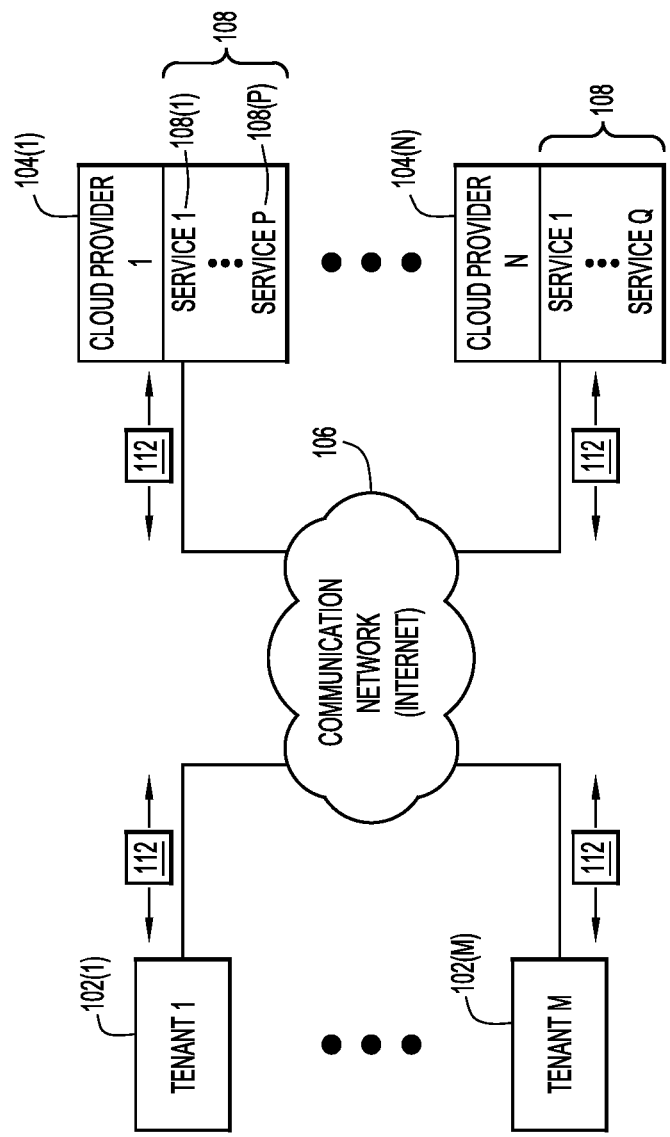
FIG. 1 is a block diagram of an example cloud computing environment in which embodiments directed to cloud provider, service, and tenant classification may be implemented, according to an example embodiment.

A cloud provider provides one or more cloud-based services to tenants of the cloud provider over a network. Each cloud-based service is configured according to a respective one of multiple service deployment schemes. A management system of the cloud provider maintains, for each service, hierarchical classification information, including: a scheme type to identify the respective service deployment scheme; a three-tuple cloud identifier including a cloud identifier to identify the cloud provider, a service identifier to identify the service, and a tenant identifier to identify a tenant permitted access to the service; and one or more scheme-specific service identifiers to identify components of the service. The management system distributes the classification information within the cloud provider, including to the services, to enable a respective tenant to exchange Internet Protocol (IP) packets with, and thereby access, a respective service and components of the service based on the classification information. The IP packet includes, for the respective service, the scheme type, the cloud identifier, the service identifier, the tenant identifier of the respective tenant, and the one or more scheme-specific service identifiers.

Example Embodiments

In a cloud computing environment, conventional techniques do not allow classification and isolation on a per-cloud, per-service, and per-tenant basis at the network layer of the Open Systems Interconnection (OSI) model. Multi-tenancy is a critical aspect of cloud computing; however, the conventional techniques to define multi-tenancy in the networks are not sufficient for cloud environments.

Conventional classification is typically based on Internet Protocol (IP) prefixes or addresses, protocol numbers identifying, for example, Transmission Control Protocol (TCP) or User Datagram Protocol (UDP), TCP/UDP port numbers and higher layer identities. These isolation techniques are used to identify individual endpoints and applications hosted; however, in cloud computing, providers host many different services on top of the same UDP/TCP ports, and the same range of public IP addresses across many endpoints. There is currently no service-awareness in networks, which is critical to properly isolate providers, theirs services and tenants.

These challenges magnify in the case of running services across multiple clouds (InterCloud use-case). Classification becomes even more critical with multi-tenancy and tenant/service mobility across clouds. Traffic between cloud environments needs to be affiliated to its originating cloud provider and services.

With the introduction of cloud computing, ways to adapt network identifiers (IDs) to the virtualized, dynamic and agile infrastructure of a cloud environment have been tried. In legacy networks, matching traffic against their Virtual Local Area Network (VLAN), IP or port affiliation often has been granular enough to accurately define business related policies; however, with cloud computing, simply relying on VLANs, IP addresses or port numbers as classification mechanisms is not sufficient. Classifying traffic based on network IDs requires deep-packet-inspection. This typically results in high latency for the tenant.

Virtual Extensible Local Area Networks (VxLANs) have been introduced recently to circumvent the limitations providers faced using VLANs. VxLAN now offers a 24-bit network segmentation ID. Even though it might address the scale limitations of VLANs, it still lacks the cloud computing specific classification and separation of providers, services and tenants.

With reference to FIG. 1, there is a block diagram of an example cloud computing environment 100 in which embodiments directed to cloud provider, service, and tenant classification may be implemented. Cloud computing environment 100 includes multiple tenants 102(1)-102(M) and multiple cloud providers 104(1)-104(N) connected with a communication network 106. Communication network 106 may include one or more wide area networks (WANs) such as the Internet and one or more local area networks (LANs). Tenants 102 include, but are not limited to, computer devices and applications operated by associated individual clients or, alternatively, organizations, such as corporate entities.

Cloud providers 104 may include data centers that provide data center infrastructure, including compute, storage, and network resources (not shown in FIG. 1). The computer, storage, and network resources of cloud providers 104 host and support respective cloud computing services 108 (also referred to as "cloud services" 108 or simply "services" 108) consumed by tenants 102 that are registered to the cloud services. For example, computer servers of each cloud provider 104(*i*) host the cloud services in that cloud provider, and network devices, such as network switches and routers, provide connectivity between the servers and internal networks of the cloud provider and external networks (such as network 106). In the example of FIG. 1, cloud provider 104(1) provides cloud services 108(1)-108(P) while cloud provider 104(N) provides cloud services 108 (1)-108(Q). Cloud services 108 may include Software-as-a-Service and/or Infrastructure-as-a-Service, or a mixture of the two types of services.

Tenants 102 communicate with cloud providers 104 and services 108 therein through network 106 and in this way access the services offered by the cloud providers. Such communication may include an exchange of IP packets 112 between tenants 102, cloud providers 104, and services 108 in the cloud providers, for example. IP packets 112 may include IP packets formatted in accordance with IPv4, IPv6, or any other presently known or hereafter developed IP format.

Generic Hierarchical Identification Scheme

Embodiments presented under this section "Generic Hierarchical Identification Scheme" implement a "generic hierarchical identification scheme" and "Universal Cloud Classification (UCC)") that uses multiple identifiers (IDs) to identify cloud providers 104, their respective services 108, and tenants 102 in an end-to-end connection between the tenants and services used thereby. In an embodiment, the UCC IDs are embedded into IP packets 112 and various databases accessible to tenants 102, cloud providers 104, and services 108. The UCC IDs may be distributed/transported within a given cloud provider 104(*i*), and also outside of the given cloud provider 104(*i*), e.g., to other cloud providers and cloud provider networks, tenants, and services, as necessary to implement the methods described herein. Structurally, the UCC IDs are loosely based on a "Digital Object Identifier" (DOI) scheme that creates hierarchical sub-identifiers within each ID. The scheme includes 3 main UCC IDs including (i) a cloud ID to identify a cloud provider, (ii) a service ID to identify a service within a cloud provider, and (iii) a tenant ID with cloud provider significance, meaning a tenant ID registered with a given cloud provider. Examples of the three UCC IDs (referred to simply as "IDs") are illustrated in FIGS. 2-4.

With reference to FIG. 2, there is an illustration of example cloud IDs 200 to identify cloud providers in the database globally (in the geographic sense). A registry of cloud provider IDs service similar to a domain name service (DNS) may be used to manage the cloud IDs, their assignments and purge. Each cloud ID in cloud IDs 200 has a name (e.g., "Amazon") and a value (e.g., 001.1310010) that is split into two sections. A first section (e.g., 001) identifies the registry location, and a second section (e.g., 1310010) provides a unique cloud provider ID/number in that region. This way, cloud IDs 200 may be used to determine the origin of flows to and from a particular cloud provider. This is useful to allow/disallow flows depending on their origins to comply with certain law requirements (i.e. data hosted in a data center located in America is not allowed to be accessed in Europe).

With reference to FIG. 3, there is an illustration of example service IDs 300 to identify services within a cloud provider. In an example, each of service IDs 300 includes a name (e.g., Dropbox) and a value having 6-bytes for 3 sub IDs that identify a data center of a cloud provider (e.g., the left-most field to the left of the left-most decimal point), a service in the data center (the center field between the decimal points), and an optional field (the right-most field).

With reference to FIG. 4, there is an illustration of example tenant IDs 400. In an example, each tenant ID of tenant IDs 400 includes a name and a value of 6 bytes to define a tenant ID with cloud provider significance. Each tenant ID of tenant IDs 400 identifies a consumer of a service, i.e., the tenant, of a cloud provider.

As mentioned above, tenants 102 exchange network packets, e.g., IP packets 112, with cloud providers 104 and services 108 therein to access the services. In an embodiment, the three IDs (e.g., from cloud IDs 200, service IDs 300, and tenant IDs 400) may be collectively embedded in IP packets 112 to uniquely identify the cloud provider, service, and tenant to which each IP packet pertains, as illustrated by way of example in FIG. 5.

Figure 5:
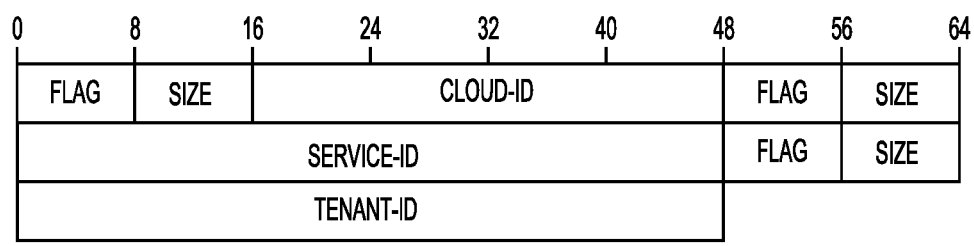
FIG. 5 is an illustration of an example header of an Internet Protocol (IP) packet that includes a cloud ID, a service ID, and a tenant ID, according to an example embodiment.

With reference to FIG. 5, there is an illustration of an example header 500 of an IP packet that includes a cloud ID, a service ID, and a tenant ID, which may be formatted as described above in connection with FIGS. 2, 3, and 4, respectively. Header 500 includes "flag" fields that are additional fields to indicate en-route behavior of the network devices which handle the IP packets that contain the header. For example, one of the flags may indicate to a network device not to drop an IP packet containing header 500 even if the network device does not understand the cloud ID, service ID, and tenant ID fields in the header. In an embodiment, in which IPv6 packets are exchanged between tenants 102, cloud providers 104, and services 108, header 500 may be included in an IPv6 packet extension header of the IPv6 packet. In another embodiment, in which IPv4 packets are exchanged between tenants 102, cloud providers 104, and services 108, header 500 may be part of headers of the IPv4 packets.

Figure 6:
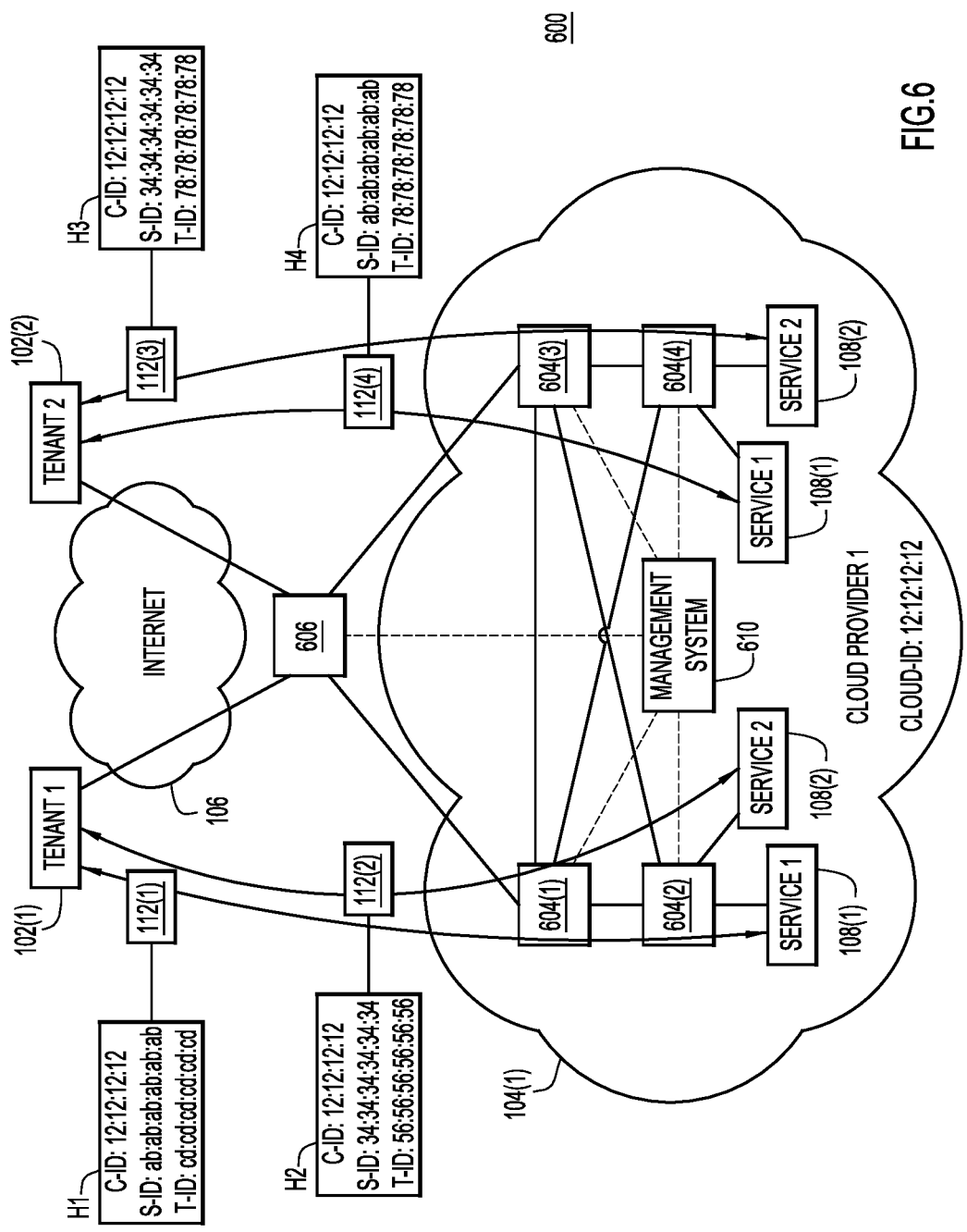
FIG. 6 is an illustration of another example cloud computing environment, according to an embodiment.

With reference to FIG. 6, there is an illustration of an example network environment 600 that expands on a portion of environment 100 focused on cloud provider 104(1), tenants 102(1) and 102(2), and cloud services 108(1) and 108(2). Environment 600 also includes network devices, e.g., network switches 604 and a router 606, to switch and route IP packets between tenants 102 and cloud services 108, and a management system 610 to manage the various cloud, service, and tenant IDs discussed above. In the example of FIG. 6, the cloud ID (C-ID), service IDs (S-IDs), and tenant IDs (T-IDs) have been assigned as follows:

a. Cloud provider 1 is assigned cloud ID 12:12:12:12;
 b. Cloud services 1 and 2 are assigned S-IDs ab:ab:ab:ab:ab:ab and 34:34:34:34:34:34, respectively;
 c. Tenant 1 is assigned T-IDs cd:cd:cd:cd:cd:cd and 56:56:56:56:56:56 for cloud service 1 and 2, respectively; and
 d. Tenant 2 is assigned T-IDs 78:78:78:78:78:78 and 78:78:78:78:78:78 (i.e., the same T-ID) for cloud services 1 and 2, respectively.

Management system 610 manages the above-mentioned cloud, service, and tenant IDs. Management system 610 may maintain a centralized store of all of the cloud, service, and tenant IDs, and update the IDs when various ones of the cloud, service, and tenant IDs are added and removed as services and tenants and added and removed. Management system 610 may also distribute the various cloud, service, and tenant IDs stored therein to tenants 102 (e.g., tenants 1 and 2), and other components of cloud provider 1, such as switches 604 and router 606, to enable the switches and routers to appropriately route packets 112 between tenants and services. In addition, management system 610 (and other components of cloud provider 1) may distribute the cloud, service, and tenant IDs outside of cloud provider 1, e.g., to other cloud providers and cloud provider networks, as necessary to implement methods described herein.

In the example of FIG. 6, tenants 1 and 2 are each registered for services 1 and 2 and access the services via exchanges of IP packets 112 with the services. As indicated in FIG. 6, switches 604 and router 606 switch and route: IP packets 112(1) between the endpoints tenant 1 and service 1; IP packets 112(2) between the endpoints tenant 1 and service 2; IP packets 112(3) between the endpoints tenant 2 and service 2; and IP packets 112(4) between the endpoints tenant 2 and service 1. IP packets 112(1)-112(4) include respective UCC headers H1-H4. Each header Hi includes a corresponding cloud ID, service ID, and tenant ID as indicated in FIG. 6 based on the assigned cloud, service, and tenant IDs.

With reference to FIG. 7, there is an illustration of an example IP packet header 700 used in the environment of FIG. 6. The contents of IP header packet header 700 are shown in hexadecimal format. IP packet header 700 may be an IPv6 extension header or an IPv4 header, for example.

Figure 8:
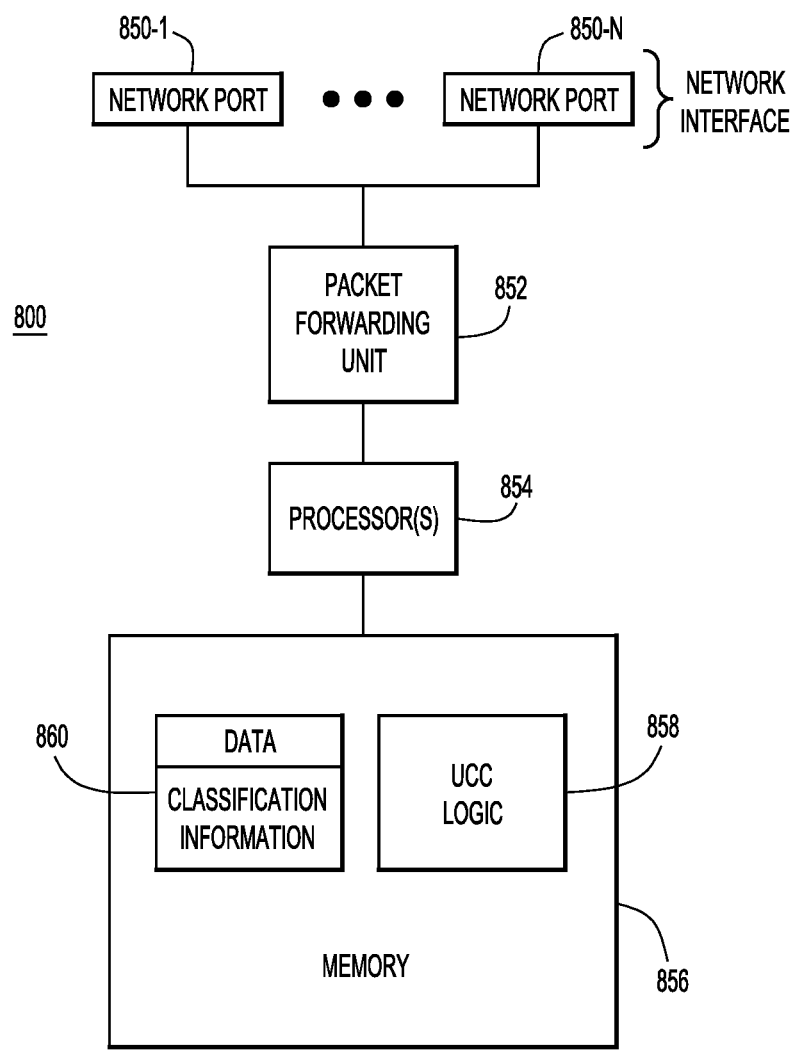
FIG. 8 is a block diagram of an example computer system to perform methods described herein, according to an example embodiment.

With reference to FIG. 8, there is a block diagram of a computer device or system 800 to implement embodiments described herein. Computer device 800 may be a network device, such as a router or switch, or a dedicated server. Computer device 800 may represent management system 610, and network devices 604 and 606. To this end, computer device 800 may include a plurality of network ports 850-1 through 850-N or other form of network interface (also referred to as a "network interface unit"), a packet forwarding unit 852 if the computer device is as switch or router, a processor 854 (or multiple processors) and memory 856. The memory stores instructions for implementing methods related to UCC and methods related to an extended scheme, described below under the section heading "Extended Hierarchical Identification Scheme."

The memory 856 may comprise read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a memory device) encoded with software comprising computer executable instructions and when the software is executed (by the processor 854) it is operable to perform the operations described herein. Memory 856 may store UCC logic 858 to implement the methods related to UCC. Memory 856 may also store logic to implement the methods related to the extended scheme. The memory may also store data 860 used and generated by UCC logic 858, such as IP addresses, and classification information, including cloud, service, and tenant IDs. Data 860 may also store data used and generated by the logic that implements the methods related to the extended scheme, including scheme type, cloud, service, and tenant IDs, and scheme-specific service IDs.

Figure 9:
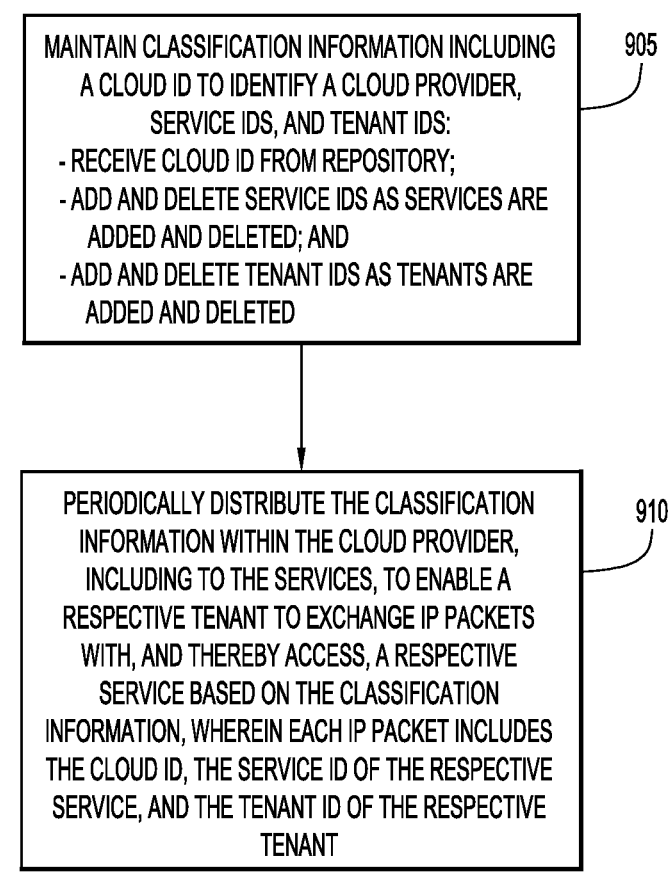
FIG. 9 is a flowchart of a method of establishing, managing, and using cloud IDs, service IDs, and tenant IDs, according to an example embodiment.

With reference to FIG. 9, there is a flowchart of a method 900 of establishing, managing, and using UCC IDs. In an embodiment, management system 610 performs method 900. It is assumed that management system 610 receives one or more cloud IDs to identify the cloud provider (e.g., cloud provider 1) in which the management system resides from a centralized, DNS-like, system that manages assignment of cloud IDs to geographically distributed cloud provider data centers.

At 905, management system 610 stores and maintains UCC classification information for the cloud provider, including the received cloud ID, all service IDs that identify the cloud services offered by the cloud provider, and all tenant IDs that identify the tenants registered to the cloud services. Management system 610 maps each service ID to a set of tenant IDs that identify tenants registered to use the service identified by the service ID. As the cloud provider adds new services and retires or deletes existing services, management system 610 adds and deletes corresponding service IDs, accordingly. Also, as the cloud provider registers new tenants to and de-registers existing tenants from the cloud provider services, management system 610 adds and deletes corresponding tenant IDs, accordingly. In this way, management system 610 dynamically updates the various UCC IDs stored by the management system.

At 910, management system 610 periodically distributes the classification information (cloud ID, service IDs, and tenant IDs) within the cloud provider, for example, the management system distributes the classification information to the services of the cloud provider and to the network devices (switches and routers) of the cloud provider. Management system 610 may also distribute the classification information to tenants that register with the cloud provider, e.g., that register with the various services. Management system 610 may distribute the classification information at scheduled intervals, or each time the management system updates the various IDs. In addition, as mentioned above, management system 610 may distribute the classification information outside of the cloud provider, for example, to tenants, services and management systems in other cloud providers, other cloud provider networks, and so on.

Management system 610 distributes the classification information as mentioned-above to enable any given tenant (e.g., a respective tenant) to exchange IP packets with, and thereby access, any given service to which the tenant is registered (e.g., a respective service) based on the classification information. Each IP packet includes the cloud ID, the service ID of the respective service, and the tenant ID of the respective tenant. Network devices in the cloud provider may use the classification information distributed thereto to map ingress and egress ports of the network device between tenant IDs of tenants and service IDs of services to which the ports are connected. The additional, fine-grained, port mapping between tenant IDs and service ID is useful for purposes of switching and routing of IP packets between specific tenants and services because, at the network level, one IP address (destination or source IP address) may be mapped to many services.

The above described generic hierarchical identification scheme can be implemented in multiple ways. Both the overall size but also the bit used per sub-identifiers are flexible and can be adjusted for future-proofing. An embodiment of this generalized hierarchical identification scheme may be part of a service/transport-centric approach referred to as "Universal Cloud Classification (UCC)". As mentioned above, the UCC may be used with IPv6 extension headers, such as the hop-by-hop or the destination option header in IPv6, or with IPv4 headers, for example. The UCC incorporates the headers into the network transport layers.

The UCC can be used to enable many different use-cases critical for cloud environments (such as per-service/per-tenant billing on a network utilization basis). This hierarchical, service/transport-centric classification approach enables use-cases both cloud-(inside) and non-cloud-specific (outside):

a. Quality of Service (inside): Quality of Service is an important tool for network operators to prefer certain traffic over others. In cloud environments, QoS has to be as specific as possible to for example prioritize the video stream from a CEO over everyone else in the company. This is difficult to achieve without classification on a per-service and per-tenant pair basis. UCC introduces the requires fine-grained isolation of traffic streams therefore making it possible to apply QoS as fine-grained as possible;

b. Routing (inside): Currently, routing within a cloud-enabled data center is based on source and destination IP addresses. To be able to differentiate routes based on tenant flows, the flows have to be distinguishable by their tenant/service affiliation. UCC introduces the required isolation that routing protocols can use to introduce fine-grained per-service or per-tenant routing decisions.

c. Billing/Metering/Monitoring (inside): For a cloud provider it is crucial to not only meter and monitor their network environment but also being able to bill tenants and services offered based on their network consumption. Currently, this is difficult because the network is unaware of the services and/or tenants defined in the cloud (still using VLAN or VxLAN to isolate networks). With UCC, cloud providers gain transparency in their networks and UCC allows them to introduce billing for per-service/per-tenant network utilization, accurate metering and monitoring of network entities.

d. Internet Routing of Cloud Data (outside), similar to the inside routing use-case but for inter-Autonomous Systems routing on the Internet: Autonomous Systems in BGP are exchanging information based on destination IP addresses. This has been sufficient until the introduction of Cloud Computing. With cloud computing and the offerings of many different services behind the same IP address, solely routing based on destination IP is not sufficient and adequate anymore. For the concept of InterCloud (a Cloud of clouds) routing entities require fine-grained forwarding information to make Cloud specific decisions. To start routing entities need to be able to define paths through the global network based on the destination service requirements. The extension header introduces by UCC provides per-service isolation from the source to the destination on Layer 3. These are the requirements to identify service-specific traffic.

e. Security (inside/outside): This use-case is valid for both inside and outside a Cloud Providers network. Applying security rules are is typically done against a certain entities in the network, typically identified by an IP address. With cloud environments, however, applying one security rule to an IP address is often not fine-grained enough as this IP address can serve multiple services with different security requirements. For example: a corporate IT department may want to apply security rules against different services hosted by another organization, such as Amazon. Currently, identifying those services is only possible using deep packet inspection, which introduces a large amount of delay and is not feasible. With UCC however, the IT department can apply security rules on a per-service ID basis (even if the flows are sourced from the same Amazon address). A similar scenario can be defined for traffic within a cloud provider's network, here being most specific by applying security rules on a per-service and per-tenant basis.

f. Federated Identity (inside/outside): Federated Identity is a way to identify a certain entity across multiple identity management systems. The proposal can be leveraged to introduce a federated identity within a cloud environment.

In summary, a generic hierarchical end-to-end classification scheme includes three IDs (cloud/service/tenant) and is more consistent with cloud infrastructure and architecture than traditional IP endpoint-based mechanisms. These IDs are carefully selected and defined as a complete data set to solve the classification challenges and inadequacies currently seen in cloud computing. The scheme has the following characteristics and advantages: hierarchical, end-to-end, optional, flexible (cloud and non-cloud applications and use-cases), extensible (and future-proof), universal, and guaranteed uniqueness.

The scheme may be used to distinguish cloud providers globally and services and tenants per provider. The scheme solves the classification ambiguity currently existing in cloud providers, while being flexible enough to enable highly desired use-cases (such as billing, security, routing all on a per-cloud/per-service/per-tenant basis both inside and outside cloud environments). Because the scheme is hierarchical and purposely built for cloud environments, it is flexible enough to cope with cloud scales and new cloud requirements. Use of an IPv6 extension header (either based on hop-by-hop or destination option) or an IPv4 header means that the header IDs are able to be understood by state-of-the-art data center hardware.

The scheme enables many use-cases that are currently difficult or not possible due to the lack of visibility within the network layer on cloud specific entities. Further advantages include: hierarchical classification of cloud entities, tenant/service isolation, IP tuple independence, identity federation, IPv6 or IPv4 interoperability, cloud and non-cloud (outside a providers network) use-case flexibility, tenant/service mobility, tenant authentication, accounting/billing, traffic classification, Internet routing of cloud data, transport flexibility L2 transparency, application-friendly.

Extended Hierarchical Identification Scheme

The above-described generic hierarchical identification scheme or UCC (also referred to herein as the "generic scheme") identifies and classifies cloud-based services and related traffic according to a "three-tuple cloud identifier," which includes cloud provider, service, and tenant identifiers. Embodiments presented under this section "Extended Hierarchical Identification Scheme" extend the generic scheme beyond the three layer hierarchy of cloud, service, and tenant identifiers to thus provide an "extended hierarchical identification" or classification scheme (also referred to as the "extended scheme"). The extended scheme adds additional levels of identification and classification of services and traffic to those of the generic scheme, depending on a specific configuration of services provided by the cloud provider.

With reference again to FIG. 1, cloud providers 104 provide cloud-based services 108, which may be configured according to a wide range of different, possible service deployment schemes or types. Examples of different types of service deployment schemes include, but are not limited to, a micro-services deployment scheme, a service-function-chaining deployment scheme, a service container deployment scheme, or mixtures of the aforementioned service deployment schemes. Each type of service deployment scheme includes, or is based on, a hierarchy of distinct, executable, service components hosted on one or more servers of cloud providers 104. To identify, and distinguish between, the different types of service deployment schemes that may be used by a cloud provider, the extended scheme adds to the generic scheme additional identifiers associated with the service identified by the service ID in the three-tuple cloud identifier of the generic scheme.

The additional identifiers of the extended include a scheme type to identify/distinguish the specific service deployment scheme used by the service and, optionally, one or more scheme-specific identifiers of the service components of the service associated with service deployment scheme identified by the scheme type. The scheme type introduces the ability to leverage different hierarchical schemas (that vary based on different service deployments), agreed upon by communicating endpoints within a cloud network, based on which cloud services are deployed and how they are deployed. Thus, the extended scheme employs hierarchical classification information including both the three-tuple cloud identifier plus the additional service deployment scheme identifiers, as will be described in detail below in connection with FIGS. 10-12.

Figure 10:
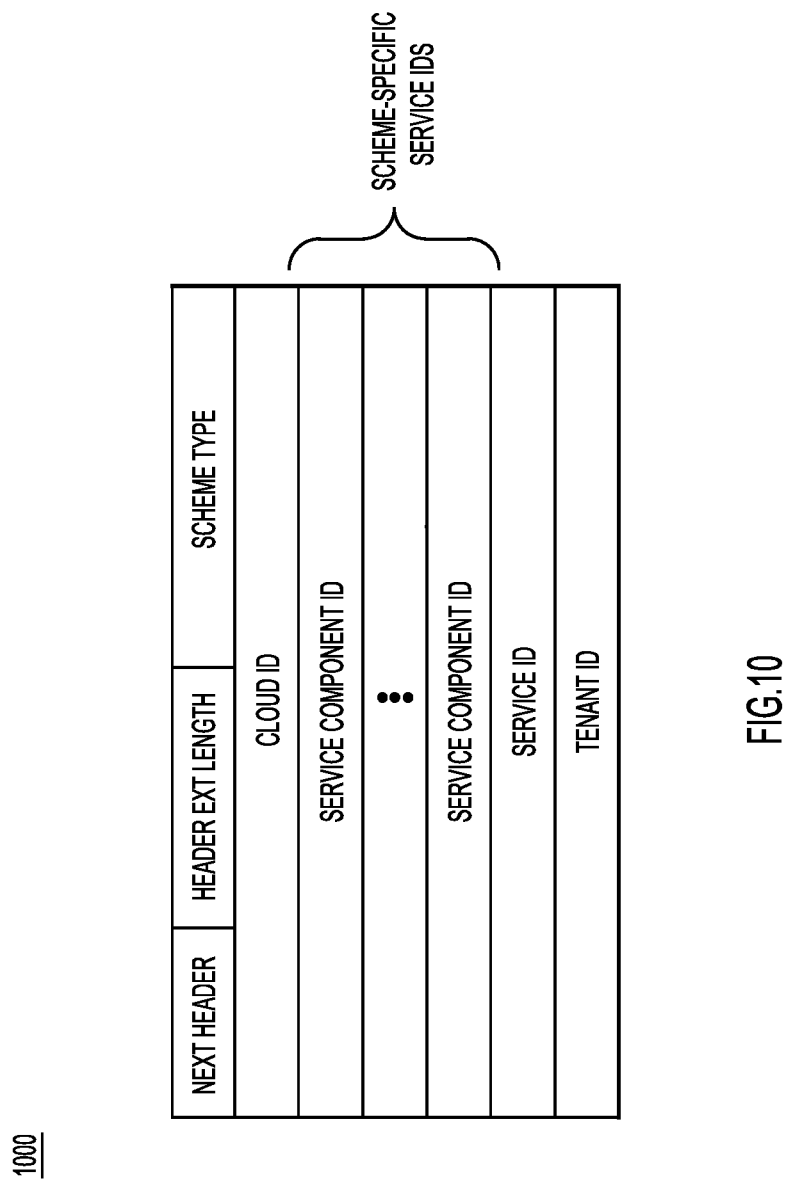
FIG. 10 is an illustration of a header of an IP packet that includes hierarchical classification information in accordance with an extended hierarchical identification scheme (the "extended scheme"), according to an example embodiment.

With reference to FIG. 10, there is an illustration of an example header 1000 of an IP packet that includes generalized hierarchical classification information in accordance with the extended scheme. In an example, header 1000 is part of an IPv6 hop-by-hop extension header. Similar to IP packet header 500 described above in connection with FIG. 5, header 1000 includes a three-tuple cloud identifier of the generic scheme, that is, a cloud ID (which is globally unique), a service ID, and a tenant ID. In accordance with the extended scheme, header 1000 also includes a scheme type to identify a particular service deployment scheme used by the service identified by the service ID. In an example, the scheme type may have an integer value, e.g., 0, 1, 2, and so on, depending on the particular service deployment scheme.

Header 1000 optionally includes one or more scheme-specific service IDs (labelled "service component IDs" in FIG. 10) of service components associated with the particular service deployment scheme identified by the scheme type. In an example, a scheme type value=0 indicates the generic scheme. In that case, i.e., when the scheme type value=0, only the three-tuple cloud identifier (cloud ID, service ID, and tenant ID) is necessary, and the optional scheme-specific service IDs (i.e., the service component IDs) may be omitted from header 1000, or may be filled with null data. For other scheme types, e.g., scheme type values=1, 2, and so on, header 1000 includes the appropriate schemed-specific service IDs.

Figure 11:
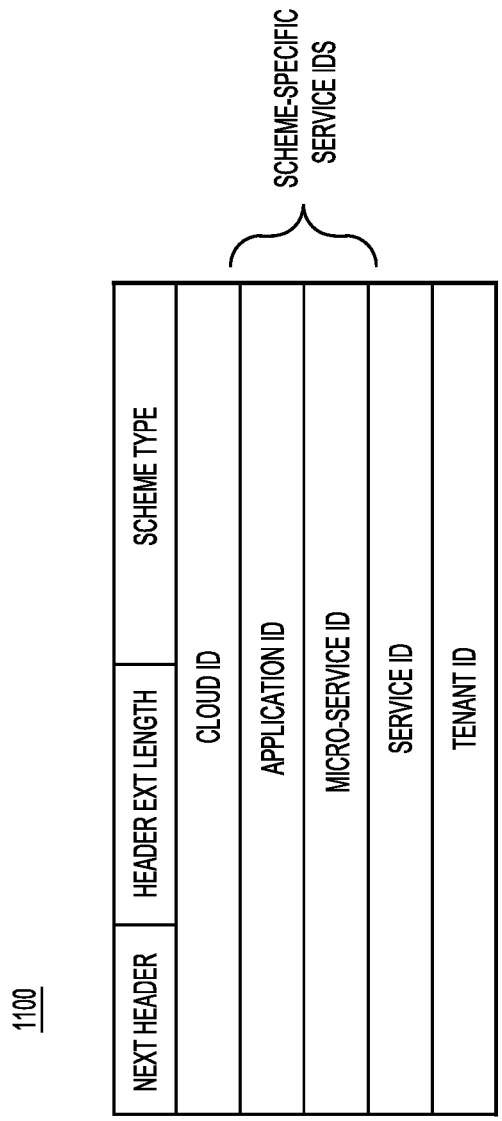
FIG. 11 is an illustration of a header of an IP packet that includes hierarchical classification information for a microservices deployment scheme, according to an example embodiment.

With reference to FIG. 11, there is an illustration of an example header 1100 of an IP packet that includes hierarchical classification information for the micro-services deployment scheme. In an example, header 1100 is part of an IPv6 hop-by-hop extension header. In the micro-services deployment scheme, a service includes one or more relatively high-level service applications, and each service application comprises multiple relatively low-level micro-services. Thus, header 1100 includes, in addition to the three-tuple cloud ID of the generic scheme, a scheme type (e.g., scheme type value=1) to identify the micro-services scheme, and one or more scheme-specific service IDs. The scheme-specific service IDs include one or more service application IDs to identify each of the one or more service applications, and one or more micro-services IDs to identify each of the micro-services under each service application. Thus, the classification information for the micro-services deployment scheme in header 1100 of the IP packet introduces service application and micro-service awareness at the IP or network level.

With reference to FIG. 12, there is an illustration of an example header 1200 of an IP packet that includes hierarchical classification information for the service-function-chaining deployment (SFC) scheme. In an example, header 1200 is implemented using SFC Network Service Header (NSH) type 2 metadata fields. Here, the metadata content is similar to the IPv6 header content, except for field extensions shown in FIG. 12. The SFC deployment scheme applies service functions to IP packets traversing the service functions along a service function path. As is known, SFC appends an NSH to each IP packet traversing the service function path. The NSH includes a service path ID and a service index (SI). The service path ID identifies the service function path, and the service index is a value that is decremented as the IP packet traverses each service function along the path. Accordingly, header 1200 includes, in addition to the three-tuple cloud ID of the generic scheme, a scheme type to identify the SFC scheme type, and fields of the NSH, i.e., a service function path ID, and a service index. In addition, header 1200 may include identifiers of service functions along the service path, e.g., service application IDs and micro-service IDs associated with the service functions. The service function path ID, service index, and service function IDs (e.g., application IDs and micro-service IDs) are all representative of scheme-specific service IDs for the SFC scheme.

Figure 13:
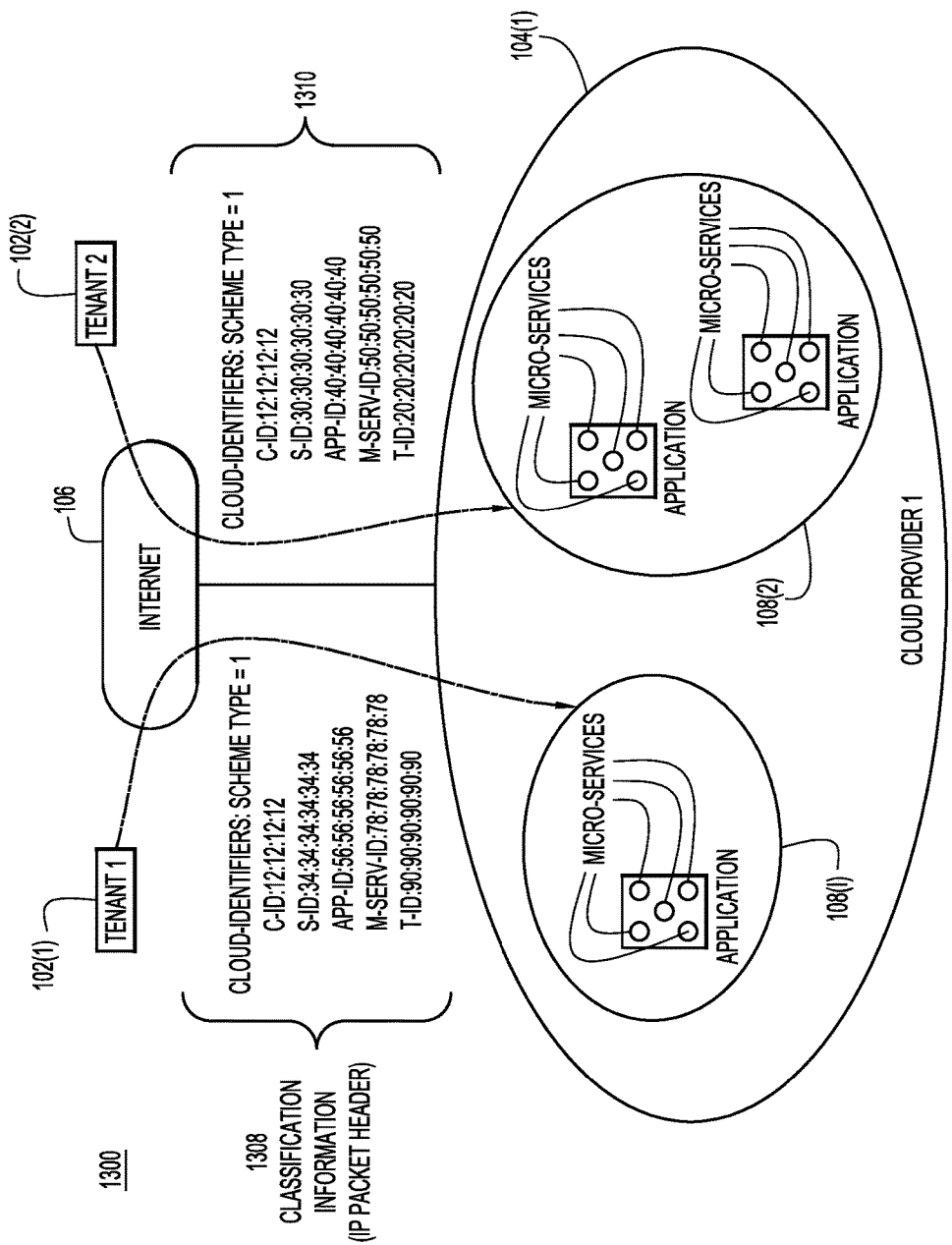
FIG. 13 is an illustration of a network environment that expands on a portion of the network environment of FIG. 6 and operates in accordance with the micro-services deployment scheme, according to an example embodiment.

With reference to FIG. 13, there is an illustration of an example network environment 1300 that expands on a portion of environment 600 and operates in accordance with the micro-services deployment scheme. Specifically, in the example of FIG. 13, services 108(1) and 108(2) of cloud provider 104(1) are each configured according to the micro-services deployment scheme. That is, service 108(1) includes a single service application having multiple micro-services, while service 108(2) includes two service applications each having respective sets of multiple micro-services, as shown. IP packets exchanged between tenants 102(1) and 102(2) and services 108(1) and 108(2) via network devices 604/606 (not shown in FIG. 13) each have an IP packet header similar to IP packet header 1100, which includes hierarchical classification information 1308, 1310 for the micro-services deployment scheme.

In the example of FIG. 13, the scheme type, cloud ID (C-ID), service IDs (S-IDs), tenant IDs (T-IDs), service application IDs (APP-IDs), and micro-service IDs (M-Serv-IDs) have been assigned as follows:

a. The scheme type is assigned a value=1 to identify the micro-services deployment scheme;
b. Cloud provider 1 is assigned cloud ID 12:12:12:12;
c. Cloud services 1 and 2 are assigned S-IDs 34:34:34: 34:34:34 and 30:30:30:30:30:30, respectively;
d. Tenants 1 and 2 are assigned T-IDs 90:90:90:90:90:90 and 20:20:20:20:20:20 for cloud services 1 and 2, respectively;
e. Service Application IDs for services 1 and 2 are assigned APP-IDs 56:56:56:56:56:56 and 40:40:40:40: 40:40, respectively (note that for service 2 only one of the service applications is identified, although both may be identified with separate APP-IDs); and
f. Micro-service IDs (M-Serv-IDs) for the micro-services under service applications in services 1 and 2 are assigned M-Serv-IDs 78:78:78:78:78:78 and 50:50:50: 50:50:50, respectively (note that more than one micro-service may be identified under each service application).

In another embodiment, a service deployment scheme may be directed to an environment in which services are containerized, for example, using Docker container-based technology, and the like. This is referred to as "containerized" or "container-based" service deployment schemes. In the containerized service deployment scheme, functions of a service application execute as micro-services in specific containers hosted on, e.g., servers, of the cloud provider. Classification information of the container-based service deployment scheme identifies micro-services and policies (and the related service applications) on a per-container basis. This permits a multi-level application of policies, whereby micro-service specific policies are aware of higher-level service application requirements. In a case of a single service application defining a single service, the classification information for the container-based service deployment scheme may include, for each container, the following set of IDs:

{CloudID:ServiceID:ApplicationID:Micro-serviceID-1: . . . Micro-serviceID-N:TenantID}.

Another embodiment uses service application and micro-service awareness as a way to identify containers and their traffic on a network. Conventional techniques identify container traffic by an IP address that is often obfuscated by the pair "host IP+port." Hence, networks run the risk of obfuscating IP packet-to-container affiliation, which makes policy enforcement to a specific container difficult. Having visibility/identities of micro-services within the IP packet itself (either transmitted as part of an IPv6 hop-by-hop extension header or any other means, such as the NSH, in-situ Operations, Administration, and Maintenance (OAM), and so on) allows identification of a specific container, without relying on a separate network construct to address containers.

According to the extended scheme, an IP address is used to identify a host (e.g., server) on which a container is executing, and a micro-service ID is used to address the container, thus separating the host identification from the container identification, and eliminating associated limitations. Relying on a micro-service ID also enables scalability for containers running on a specific server. For example, a single host may host several thousand micro-service containers. With such large numbers of containers, limited legacy networks are forced to re-use identifiers, which causes problems for container networking. The extended scheme may also be applied to virtual machines (VMs) running on a container, in which scheme-specific service identifiers include VM IDs to identify VMs. This allows the design of a uniform network architecture for both containerized and VM-based service applications.

It is understood that tenants 102, cloud providers 104, services 108 and their components exchange and operate on/process the IP packets, including IPv4 and IPv6 packets, configured according to the extended scheme substantially the same way the tenants, cloud providers, and services exchange and operate on/process the IP packets configured according to the generic scheme (e.g., as described in connection with FIG. 6), except for differences described herein.

Figure 14:
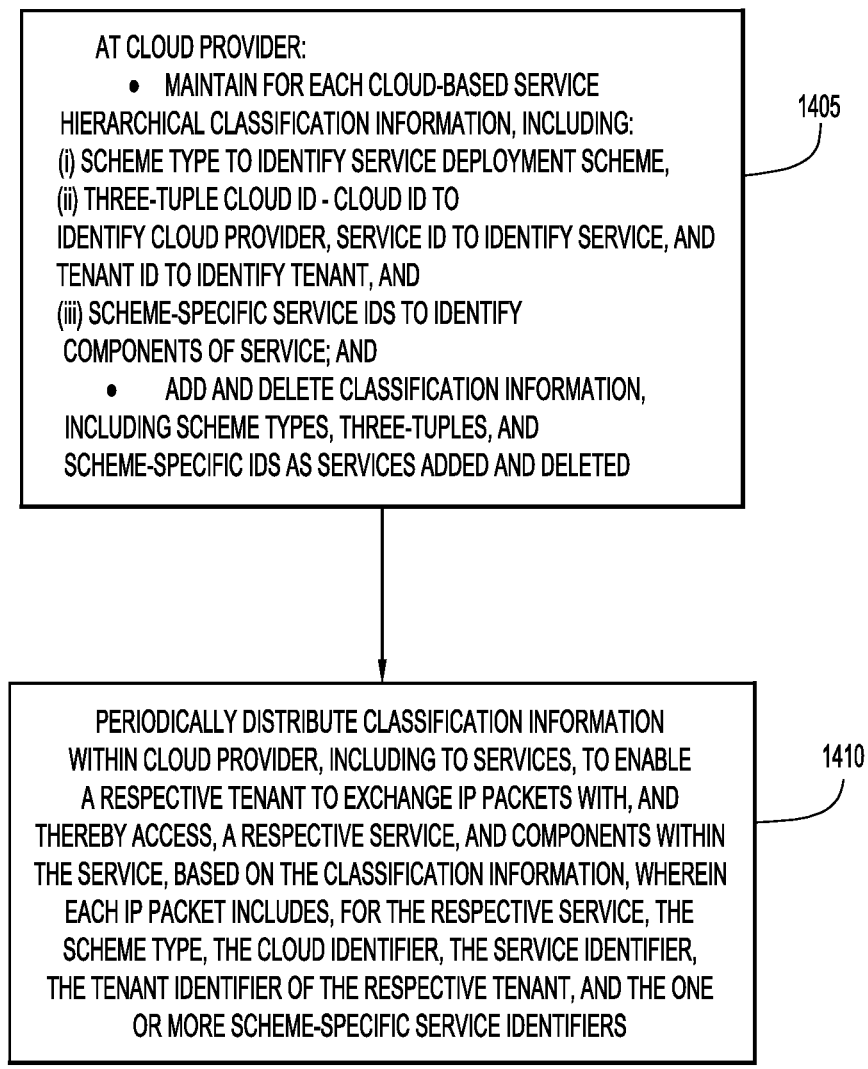
FIG. 14 is a flowchart of a method of establishing, managing, and using classification information for the extended scheme.

With reference to FIG. 14, there is a flowchart of a method 1400 of establishing, managing, and using classification information for the extended scheme, performed by management system 610. Method 1400 is similar to method 900, except as extended to include/handle classification information for the extended scheme. It is assumed that each cloud-based service provided by a given cloud provider is configured according to any one of a number of different possible service deployment schemes, as described above.

At 1405, management system 610 stores and maintains extended scheme hierarchical classification information for a given cloud provider that provides one or more cloud-based services, each configured according to any one of the different service deployment schemes. The hierarchical classification information includes, for each service:

a. a scheme type to identify the respective service deployment scheme;
b. a three-tuple cloud ID including a cloud ID to identify the cloud provider, a service ID to identify the service, and a tenant ID to identify a tenant permitted access to the service; and
c. one or more scheme-specific service IDs to identify hierarchical components of the service Management system 610 maps each service ID to a set of tenant IDs that identify tenants registered to use the service identified by the service ID. As the cloud provider adds new services and retires or deletes existing services, management system 610 adds and deletes corresponding scheme-types, three-tuple cloud IDs, and scheme-specific service identifiers, accordingly. Also, as the cloud provider registers new tenants to and de-registers existing tenants from the cloud provider services, management system 610 adds and deletes corresponding tenant IDs, accordingly. In this way, management system 610 dynamically updates the various extended scheme IDs stored by the management system.

At 1410, management system 610 periodically distributes the classification information (scheme type, cloud ID, service IDs, tenant IDs, and scheme-specific service identifiers) within the cloud provider, for example, the management system distributes the classification information to the services of the cloud provider and to the network devices (switches and routers) of the cloud provider. Management system 610 may also distribute the classification information to tenants that register with the cloud provider, e.g., that register with the various services. Management system 610 may distribute the classification information at scheduled intervals, or each time the management system updates the various IDs. In addition, as mentioned above, management system 610 may distribute the classification information outside of the cloud provider, for example, to tenants, services and management systems in other cloud providers, other cloud provider networks, and so on.

Management system 610 distributes the classification information as mentioned-above to enable any given tenant (e.g., a respective tenant) to exchange IP packets with, and thereby access, any given service, and components of the service, to which the tenant is registered (e.g., a respective service) based on the classification information. Each IP packet includes, for the respective service, the scheme type, the cloud identifier, the service identifier, the tenant identifier of the respective tenant, and the one or more scheme-specific service identifiers. Network devices in the cloud provider may use the classification information distributed thereto to map ingress and egress ports of the network device between tenant IDs of tenants, service IDs, and scheme-specific identifiers of services to which the ports are connected. The additional, fine-grained, port mapping between tenant IDs, service IDs, and scheme-specific service IDs is useful for purposes of switching and routing of IP packets between specific tenants and services because, at the network level, one IP address (destination or source IP address) may be mapped to many services and scheme-specific service IDs.

In addition to the above-operations performed by management system 610, each of network devices 604/606 perform operations to route IP packets that include the classification information for the extended schemes in their respective headers. For example, each of network devices 604/606 may receive from a respective service an outbound IP packet destined for a respective tenant, and also receive from the respective tenant an inbound IP packet destined for the respective service, where each IP packet includes the scheme type, the three-tuple cloud identifier, and the set of scheme-specific service identifiers. The network device forwards the outbound IP packet to the respective tenant and the inbound IP packet to the respective service. In support of this, the network device may parse the classification information in the inbound IP packet to retrieve the one or more scheme-specific identifiers from the classification information, and then forward the inbound packet to the respective service based on the retrieved one or more scheme-specific identifiers.

In addition to the above-operations performed by management system 610, each of services 108 may perform operations on IP packets, carrying the classification information according to the extended scheme, received from a respective tenant (via one or more of network devices 604). For example, upon receiving an IP packet, a service (or server hosting the service) may parse the classification information in the IP packet to retrieve at least the scheme type and the one or more scheme-specific identifiers. Then, the service sends the retrieved information to service components identified by the scheme-specific identifiers.

In summary, the extended scheme provides systems and methods for future extensions of the generic scheme to a wide range of known or hereafter developed service deployment schemes. For example, the extended scheme is leveraged to provide micro-service awareness at a network level, in which network traffic can be uniquely affiliated to a service, application within the service, a specific micro-service within that application and a tenant using the [service/application/micro-service] offering In summary, in one form, a method is provided comprising: at a cloud provider to provide one or more cloud-based services to tenants of the cloud provider over a network, wherein each cloud-based service is configured according to a respective one of multiple service deployment schemes: maintaining, for each service, hierarchical classification information, including: a scheme type to identify the respective service deployment scheme; a three-tuple cloud identifier including a cloud identifier to identify the cloud provider, a service identifier to identify the service, and a tenant identifier to identify a tenant permitted access to the service; and one or more scheme-specific service identifiers to identify components of the service; and distributing the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

In another form, an apparatus is provided comprising: a network interface unit to communicate with devices in a cloud provider configured to provide one or more cloud-based services to tenants of the cloud provider over a network, wherein each cloud-based service is configured according to a respective one of multiple service deployment schemes; and a processor coupled to the network interface unit and configured to: maintain, for each service, hierarchical classification information, including: a scheme type to identify the respective service deployment scheme; a three-tuple cloud identifier including a cloud identifier to identify the cloud provider, a service identifier to identify the service, and a tenant identifier to identify a tenant permitted access to the service; and one or more scheme-specific service identifiers to identify components of the service; and distribute the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

In yet another form, a non-transitory processor readable medium is provided. The processor readable medium stores instructions that, when executed by a processor, cause the processor to: maintain, for each service, hierarchical classification information, including: a scheme type to identify the respective service deployment scheme; a three-tuple cloud identifier including a cloud identifier to identify the cloud provider, a service identifier to identify the service, and a tenant identifier to identify a tenant permitted access to the service; and one or more scheme-specific service identifiers to identify components of the service; and distribute the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a cloud provider to provide one or more services that are cloud-based to tenants of the cloud provider over a network, wherein each service is configured according to a respective one of multiple service deployment schemes:
    maintaining, for each service, hierarchical classification information, including:
        a scheme type to identify the respective service deployment scheme;
        a three-tuple cloud identifier including a cloud identifier to identify the cloud provider, a service identifier to identify the service, and a tenant identifier to identify a tenant permitted access to the service; and
        one or more scheme-specific service identifiers to identify components of the service; and
    distributing the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

2. The method of claim 1, wherein the multiple service deployment schemes include a micro-services deployment scheme in which a service includes one or more service applications and multiple micro-services under each service application, and for which the hierarchical classification information includes:
    a scheme type to identify the micro-services deployment scheme;
    a three-tuple cloud identifier; and
    respective identifiers for each service application and each micro-service under each service application.

3. The method of claim 1, wherein the multiple service deployment schemes include a service-function-chaining (SFC) deployment scheme in which a service provides service-function-chaining of service functions to be applied to IP packets along a service function path, and for which the hierarchical classification information includes:
    a scheme type to identify the service-function-chain deployment scheme;
    a three-tuple cloud identifier; and
    a service path identifier to identify the service function path, a service index, and identifiers of at least one of a service application and a micro-service under a service application.

4. The method of claim 1, wherein:
    the maintaining includes updating the classification information each time a new service is added or an existing service is removed from the cloud provider and each time a new tenant is added or an existing tenant is removed.

5. The method of claim 1, wherein:
    the cloud provider includes servers to host the services and network devices to provide connectivity between the services and the network; and
    the distributing includes distributing the classification information to the network devices to enable the network devices to route IP packets between the respective service and the respective tenant based on the classification information distributed to the network devices and included in the IP packets.

6. The method of claim 5, further comprising, at one of the network devices:
    receiving from the respective service an outbound IP packet destined for the respective tenant, and receiving from the respective tenant an inbound IP packet destined for the respective service, each IP packet including the scheme type, the three-tuple cloud identifier, and the one or more scheme-specific service identifiers; and
    forwarding the outbound IP packet to the respective tenant and the inbound IP packet to the respective service.

7. The method of claim 6, further comprising, at the one of the network devices:
    parsing the classification information in the inbound IP packet to retrieve the one or more scheme-specific service identifiers from the classification information, wherein the forwarding the inbound packet to the respective service includes forwarding the inbound packet based on the retrieved one or more scheme-specific service identifiers.

8. The method of claim 7, wherein each IP packet is an IP packet formatted according to IPv4 or IPv6.

9. The method of claim 1, further comprising, at the respective service:
    receiving an IP packet from the respective tenant;
    parsing the classification information in the IP packet to retrieve at least the scheme type and the one or more scheme-specific service identifiers; and
    sending information from the IP packet to the components of the service as identified by the one or more scheme-specific service identifiers retrieved from the IP packet.

10. The method of claim 1, wherein the cloud-identifier includes an identifier of a geographical region of the cloud provider, and a unique cloud provider identifier.

11. The method of claim 10, wherein the service-identifier includes a cloud provider data center identifier, and an identifier of the services in the data center.

12. The method of claim 1, wherein each IP packet includes, in addition to source and destination IP addresses corresponding to the respective tenant and the respective service, an IP packet header field that includes the classification information.

13. An apparatus comprising:
    a network interface unit to communicate with devices in a cloud provider configured to provide one or more services that are cloud-based to tenants of the cloud provider over a network, wherein each service is configured according to a respective one of multiple service deployment schemes; and
    a processor coupled to the network interface unit and configured to:
        maintain, for each service, hierarchical classification information, including:
            a scheme type to identify the respective service deployment scheme;
            a three-tuple cloud identifier including a cloud identifier to identify the cloud provider, a service identifier to identify the service, and a tenant identifier to identify a tenant permitted access to the service; and
            one or more scheme-specific service identifiers to identify components of the service; and
        distribute the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

14. The apparatus of claim 13, wherein the multiple service deployment schemes include a micro-services deployment scheme in which a service includes one or more service applications and multiple micro-services under each service application, and for which the hierarchical classification information includes:
   a scheme type to identify the micro-services deployment scheme;
   a three-tuple cloud identifier; and
   respective identifiers for each service application and each micro-service under each service application.

15. The apparatus of claim 13, wherein the multiple service deployment schemes include a service-function-chaining (SFC) deployment scheme in which a service provides service-function-chaining of service functions to be applied to IP packets along a service function path, and for which the hierarchical classification information includes:
   a scheme type to identify the service-function-chain deployment scheme;
   a three-tuple cloud identifier; and
   a service path identifier to identify the service function path, a service index, and identifiers of at least one of a service application and a micro-service under a service application.

16. The apparatus of claim 13, wherein the processor is configured to maintain by:
   updating the classification information each time a new service is added or an existing service is removed from the cloud provider and each time a new tenant is added or an existing tenant is removed.

17. The apparatus of claim 13, wherein:
   the cloud provider includes servers to host the services and network devices to provide connectivity between the services and the network; and
   the processor is configured to distribute by distributing the classification information to the network devices to enable the network devices to route IP packets between the respective service and the respective tenant based on the classification information distributed to the network devices and included in the IP packets.

18. A non-transitory computer readable storage media encoded with instructions that, when executed by a processor of a management system in a cloud provider configured to provide one or more services that are cloud-based to tenants of the cloud provider over a network, wherein each service is configured according to a respective one of multiple service deployment schemes, cause the processor to:
   maintain, for each service, hierarchical classification information, including:
      a scheme type to identify the respective service deployment scheme;
      a three-tuple cloud identifier including a cloud identifier to identify the cloud provider, a service identifier to identify the service, and a tenant identifier to identify a tenant permitted access to the service; and
      one or more scheme-specific service identifiers to identify components of the service; and
   distribute the classification information within the cloud provider, including to the one or more services, to enable a respective tenant to exchange Internet Protocol (IP) packets with, and thereby access, a respective service and components of that service based on the classification information, wherein each IP packet includes, for the respective service, the scheme type, the cloud identifier, the service identifier, the tenant identifier of the respective tenant, and the one or more scheme-specific service identifiers.

19. The non-transitory computer readable storage media of claim 18, wherein the instructions to cause the processor to maintain include instructions to cause the processor to:
   update the classification information each time a new service is added or an existing service is removed from the cloud provider and each time a new tenant is added or an existing tenant is removed.

20. The non-transitory computer readable storage media of claim 18, wherein:
   the cloud provider includes servers to host the services and network devices to provide connectivity between the services and the network; and
   the instructions to cause the processor to distribute include instructions to cause the processor to distribute the classification information to the network devices to enable the network devices to route IP packets between the respective service and the respective tenant based on the classification information distributed to the network devices and included in the IP packets.

* * * * *